(12) United States Patent
Ganfield et al.

(10) Patent No.: US 7,248,595 B2
(45) Date of Patent: Jul. 24, 2007

(54) METHOD, APPARATUS, AND COMPUTER PROGRAM PRODUCT FOR IMPLEMENTING PACKET ORDERING

(75) Inventors: Paul Allen Ganfield, Rochester, MN (US); Kerry Christopher Imming, Rochester, MN (US); John David Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 10/624,351

(22) Filed: Jul. 22, 2003

(65) Prior Publication Data

US 2005/0018699 A1    Jan. 27, 2005

(51) Int. Cl.
*H04L 12/56* (2006.01)

(52) U.S. Cl. ...................... 370/412; 370/235

(58) Field of Classification Search ........ 370/412–418, 370/235, 394, 398, 474, 216; 709/215
See application file for complete search history.

(56) References Cited

U.S. PATENT DOCUMENTS

| | | | | |
|---|---|---|---|---|
| 5,260,933 A | * | 11/1993 | Rouse | 370/216 |
| 5,648,970 A | * | 7/1997 | Kapoor | 370/394 |
| 5,838,915 A | * | 11/1998 | Klausmeier et al. | 709/215 |
| 6,064,674 A | * | 5/2000 | Doidge et al. | 370/398 |
| 6,934,294 B2 | * | 8/2005 | Bertagna | 370/412 |
| 6,952,402 B1 | * | 10/2005 | Crocker et al. | 370/235 |
| 2003/0108066 A1 | * | 6/2003 | Trippe | 370/474 |

* cited by examiner

*Primary Examiner*—Chi Pham
*Assistant Examiner*—Albert T. Chou
(74) *Attorney, Agent, or Firm*—Joan Pennington

(57) ABSTRACT

A method, apparatus, and computer program product are provided for implementing packet ordering in a network processor. Packets are received and placed on a receive queue and a queue entry is provided for each received packet. The queue entry includes for each autoroute packet, an autoroute indication and a selected transmit queue. An associated ordering queue is provided with the receive queue. A software-handled packet is dequeued from the receive queue and the dequeued software-handled packet is placed on the ordering queue. Each autoroute packet reaching a head of the receive queue is automatically moved to the selected ordering queue.

12 Claims, 6 Drawing Sheets

300

| RECEIVE QUEUE 1, 202 | 6 | 5 | | | |
|---|---|---|---|---|---|
| RECEIVE QUEUE 2, 202 | | 11 | 10<br>A-11 | 9<br>A-11 | 8 | 7 |

| ORDERING QUEUE 1, 204 | 4<br>A-11 | 3<br>A-11 | 2<br>A-10 | 1 |
|---|---|---|---|---|

ORDERING QUEUE 2, 204 □

TRANSMIT QUEUE 10, 206 □

TRANSMIT QUEUE 11, 206 □

SOFTWARE POINTER 302: | 1 | PSR

RECEIVE QUEUE 1, 202

RECEIVE QUEUE 2, 202

ORDERING QUEUE 1, 204

ORDERING QUEUE 2, 204

TRANSMIT QUEUE 10, 206

TRANSMIT QUEUE 11, 206

SOFTWARE POINTER 402:   PSRs

500

RECEIVE QUEUE 1, 202

RECEIVE QUEUE 2, 202

ORDERING QUEUE 1, 204

ORDERING QUEUE 2, 204

TRANSMIT QUEUE 10, 206

TRANSMIT QUEUE 11, 206

SOFTWARE POINTER 502: PSRs

METHOD, APPARATUS, AND COMPUTER PROGRAM PRODUCT FOR IMPLEMENTING PACKET ORDERING

FIELD OF THE INVENTION

The present invention relates generally to the data processing field, and more particularly, relates to a method, apparatus, and computer program product for implementing packet ordering in a network processor.

DESCRIPTION OF THE RELATED ART

Packets that are transmitted from the network processor are required to be kept in the same order they were received. In a known network processor, many packets can be autorouted or processed by hardware for transmission on a particular transmit queue. Some packets still need to be processed by software instead.

As used in the following specification and claims, an autoroute packet means that hardware determines the particular transmit queue for the packet.

Both autoroute packets and software-handled packets need to be kept in order as they are transmitted, even though different processes are causing the enqueue for transmission to occur.

A need exists for an effective mechanism for implementing packet ordering in a network processor that maintains transmission ordering for both autoroute packets and software-handled packets.

SUMMARY OF THE INVENTION

A principal object of the present invention is to provide a method, apparatus, and computer program product for implementing packet ordering in a network processor. Other important objects of the present invention are to provide such method, apparatus, and computer program product for implementing packet ordering in a network processor substantially without negative effect and that overcome many of the disadvantages of prior art arrangements.

In brief, a method, apparatus, and computer program product are provided for implementing packet ordering in a network processor. Packets are received and placed on a receive queue and a queue entry is provided for each received packet. The queue entry includes for each autoroute packet, an autoroute indication and a selected transmit queue. An associated ordering queue is provided with the receive queue. A software-handled packet is dequeued from the receive queue and the dequeued software-handled packet is placed on the ordering queue. Each autoroute packet reaching a head of the receive queue is automatically moved to the selected ordering queue.

In accordance with features of the invention, a software-handled packet is enqueued from the ordering queue to a transmit queue. Each autoroute packet reaching a head of the ordering queue is automatically moved to the selected transmit queue.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a block diagram illustrating an exemplary resulting queue structure following software packet dequeues from a first receive queue of FIG. 2 in the network processor system of FIG. 1 in accordance with the preferred embodiment;

DETAILED DESCRIPTION OF THE PREFERRED EMBODIMENTS

Figure 1:
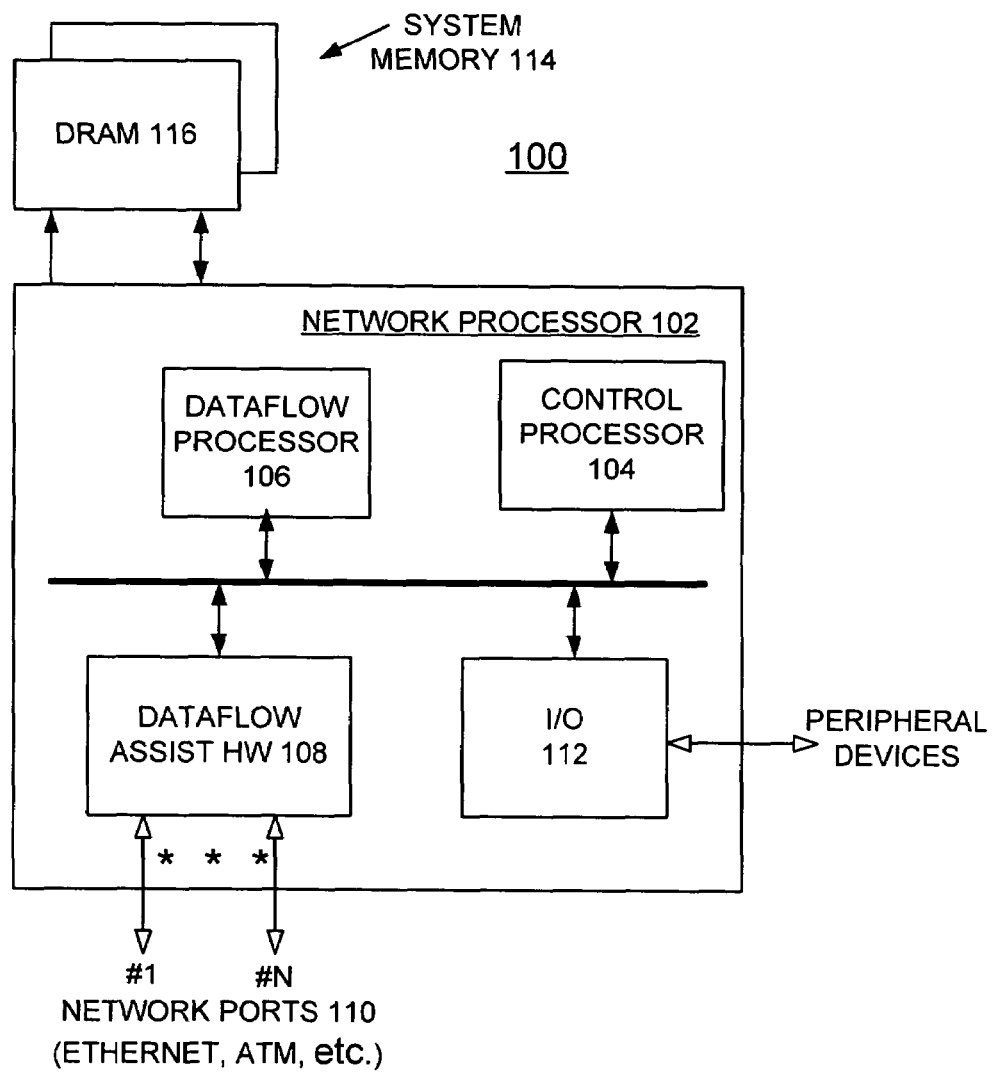
FIG. 1 is a block diagram representation illustrating a network processor system for implementing packet ordering in accordance with the preferred embodiment.

Having reference now to the drawings, in FIG. 1, there is shown a network processor system generally designated by the reference character 100 for carrying out methods for implementing packet ordering of the preferred embodiment. As shown in FIG. 1, network processor system 100 includes a network processor 102. Network processor system 100 includes a control processor 104, and a dataflow processor 106 coupled by a network processor bus to dataflow assist hardware (HW) 108 of the preferred embodiment. The dataflow assist hardware (HW) 108 of the preferred embodiment is coupled to multiple network ports #1-N 110 for communicating using known network protocols, such as, an Asynchronous Transfer Mode (ATM), Ethernet, and the like. Network processor system 100 includes an input/output (I/O) 112 coupled to peripheral devices. Network processor system 100 includes a system memory 114 including a dynamic random access memory (DRAM) 116.

Control processor 104 and dataflow processor 106 of network processor 102 can be implemented with various standard processors, for example, with one of the PowerPC® line of processors manufactured by International Business Machines Corporation.

In accordance with features of the preferred embodiment, packets are received and are placed on a receive queue, along with an indication of being autoroute or not. For each autoroute packet, a particular ultimate transmit queue also is part of the queue entry. Software dequeues and processes each software-handled packet on the receive queue that is not an autoroute packet, otherwise the autoroute packet will be transmitted without software intervention. To keep the packets in order, when software dequeues a software-handled packet from the receive queue, or when the next packet is autoroute, the packet is placed on an ordering queue. The packets are maintained in the proper order on the ordering queue. When software enqueues sequential packets for transmission, a next packet and any autoroute packet or packets after the next packet on the ordering queue are moved to the transmit queues, so the packets are kept in order. There is an ordering queue associated with each receive queue so that when software enqueues a packet for transmission, the enqueued packet will be at the front of the ordering queue.

Referring now to FIGS. 2-5, there are shown exemplary queue diagrams illustrating packet ordering in the network processor system 100 in accordance with the preferred embodiment.

Figure 2:
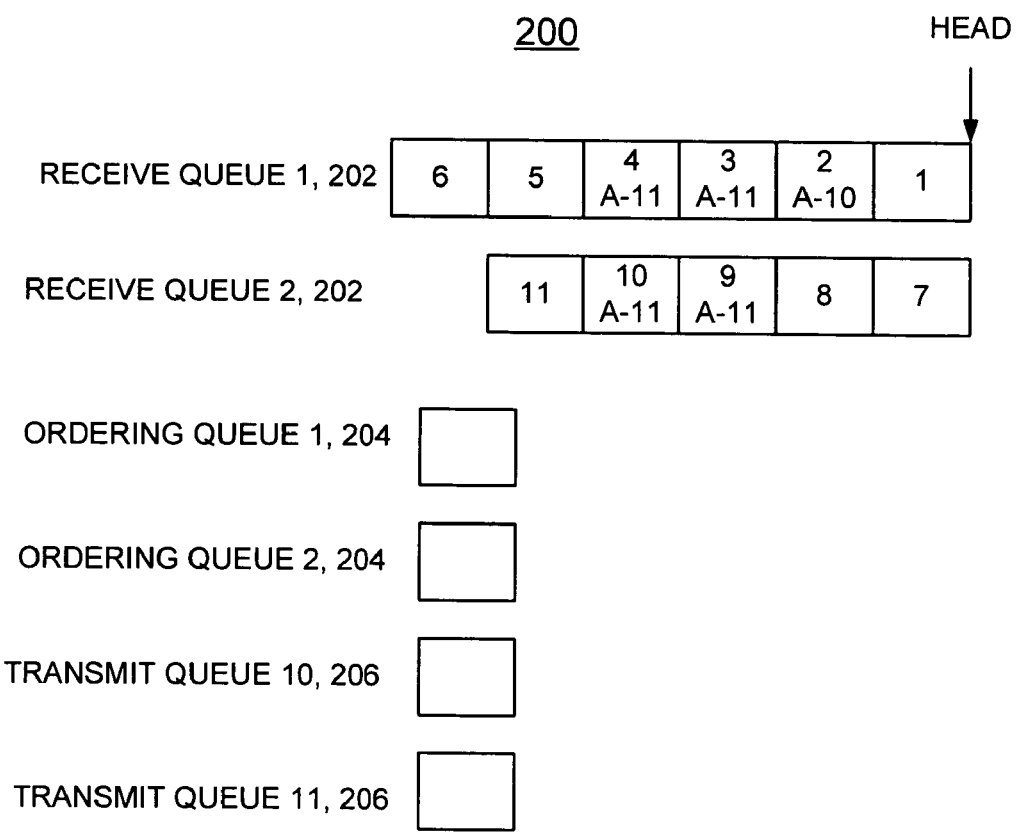
FIG. 2 is a block diagram representation illustrating an exemplary queue structure including initial queues in the network processor system of FIG. 1 in accordance with the preferred embodiment.

FIG. 2 illustrates an exemplary queue structure generally designated by the reference character 200 in the network processor system 100 in accordance with the preferred embodiment. As shown, queue structure 200 includes a first receive queue 1, 202, and a second receive queue 2, 202 together with a respective associated ordering queue 1 and 2, 204, and a pair of transmit queues 10 and 11, 206. Packet numbers are shown within the first receive queue 1, 202, and the second receive queue 2. Autoroute packets include also an autoroute designation A-x, where a particular transmit queue is represented by -x. A particular transmit queue for each of the autoroute packets is identified by dataflow assist hardware 108 without software intervention. As shown, the first receive queue 1, 202 includes three autoroute packets 2, 3, and 4 respectively labeled A-10, A-11, and A-11 indicating autoroute to transmit queues 10 and 11, 206. The second receive queue 2, 202 includes two autoroute packets 9, and 10 respectively labeled A-11 indicating autoroute to transmit queue 11, 206. The associated ordering queues 1 and 2, 204, and transmit queues 10 and 11, 206 are empty. The head of the receive queue 1, 202 is indicated by an arrow labeled HEAD.

FIG. 3 illustrates an exemplary resulting queue structure generally designated by the reference character 300 in the network processor system 100 in accordance with the preferred embodiment following software packet dequeues from the first receive queue 1, 202 of FIG. 2. Software includes a pointer 302 to packet 1 in a packet segment register (PSR). In queue structure 300, packet 1, and autoroute packets 2, 3, 4 respectively labeled A-10, A-11, and A-11 are moved to ordering queue 1, 204 from the first receive queue 1, 202 of FIG. 2. The dequeue caused the packet 1 to be placed on the ordering queue 1, 204 and also autoroute packets 2, 3, 4 respectively labeled A-10, A-11, and A-11 when reaching the head of the receive queue 1, 202 are automatically moved to the ordering queue. Following the dequeue, packets 5 and 6 remain in the first receive queue 1, 202.

Figure 4:
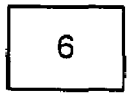
FIG. 4 is a block diagram illustrating an exemplary resulting queue structure following software packet dequeues from a second queue and another packet from the first receive queue of FIG. 3 in the network processor system of FIG. 1 in accordance with the preferred embodiment.
Figure 4:
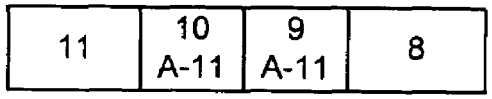
Figure 4:
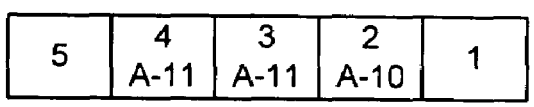
Figure 4:
Figure 4:
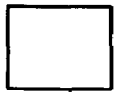
Figure 4:
Figure 4:
Figure 4:
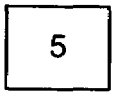
Figure 4:
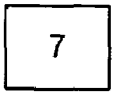

FIG. 4 illustrates an exemplary resulting queue structure generally designated by the reference character 400 in the network processor system 100 in accordance with the preferred embodiment following software packet dequeues from the second receive queue 2, 202 and another packet from the first receive queue 1, 202 of FIG. 3. Software includes pointers 402 to packets 1, 5, and 7 in PSRs. Packet 5 is moved to ordering queue 1, 204 from the first receive queue 1, 202 of FIG. 3. Packet 7 is moved to ordering queue 2, 204 from the second receive queue 2, 202 of FIG. 3.

Figure 5:
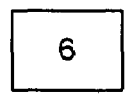
FIG. 5 is a block diagram illustrating an exemplary resulting queue structure following software packet enqueues to transmit queues from a first ordering queue of FIG. 4 in the network processor system of FIG. 1 in accordance with the preferred embodiment.
Figure 5:
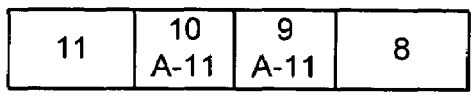
Figure 5:
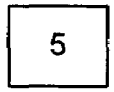
Figure 5:
Figure 5:
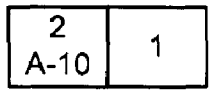
Figure 5:
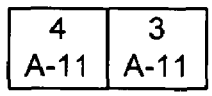
Figure 5:
Figure 5:

FIG. 5 illustrates an exemplary queue structure generally designated by the reference character 500 in the network processor system 100 in accordance with the preferred embodiment following software packet enqueues to the transmit queues 10 and 11, 206 from the first ordering queue of FIG. 4. An enqueue of packet 1 to transmit queue 10 by software, and moving of autoroute packets 2, and 3, 4 to respective transmit queues 10 and 11, 206 causes these packet to be removed from the ordering queue 1, 204. Software includes pointers 502 to packets 5, and 7 in PSRs. Software must keep the packets in order, so packet 1 must be enqueued to a transmit queue before packet 5. Queue structure 500 illustrates enqueuing packet 1 to transmit queue 10, 206. The enqueue to the transmit queue by software causes the packet 1 to be removed from the ordering queue 1, 204. Then the autoroute packets 2, 3, 4 at the head of the ordering queue 1, 204 are automatically moved to the respective transmit queues 10, 11, 206.

Figure 6:
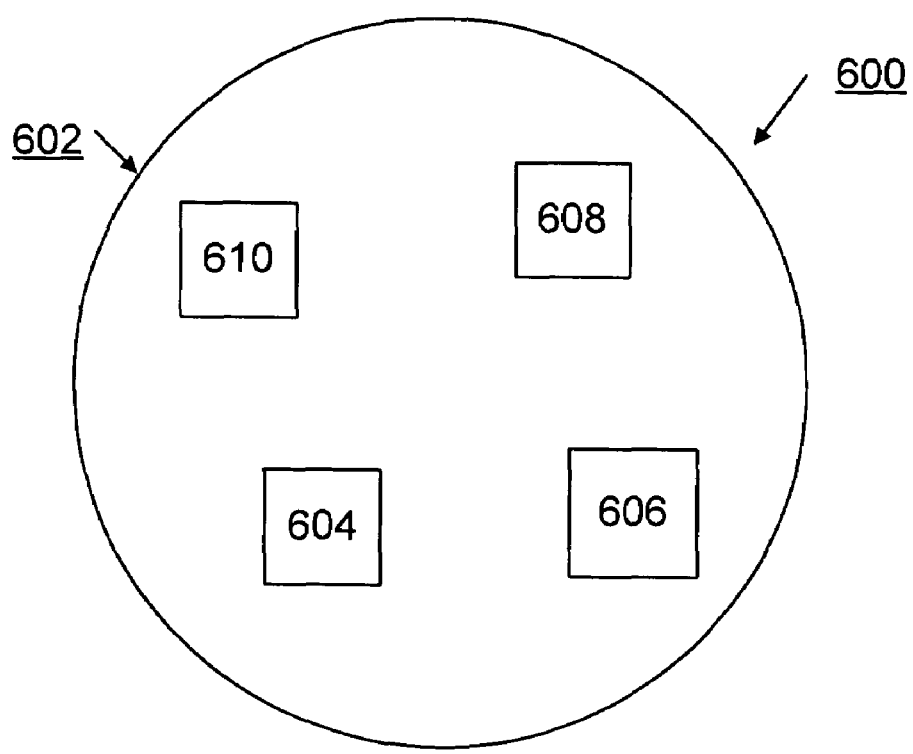
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing packet ordering of the preferred embodiment in the network processor 100 of FIG. 1.

A sequence of program instructions or a logical assembly of one or more interrelated modules defined by the recorded program means 604, 606, 608, 610, direct the network processor 100 for implementing packet ordering of the preferred embodiment.

While the present invention has been described with reference to the details of the embodiments of the invention shown in the drawing, these details are not intended to limit the scope of the invention as claimed in the appended claims.

What is claimed is:

1. A method for implementing packet ordering in a network processor comprising the steps of:
   receiving packets and placing said received packets on a receive queue and providing a queue entry for each said received packet; said queue entry including for each autoroute packet, an autoroute indication and a selected transmit queue;
   providing an associated ordering queue with said receive queue;
   dequeuing a software-handled packet from said receive queue and placing said dequeued software-handled packet on said ordering queue;
   automatically moving each said autoroute packet reaching a head of said receive queue to said ordering queue; and
   moving a next packet from said ordering queue to a selected transmit queue for network transmission.

2. A method for implementing packet ordering as recited in claim 1 wherein moving a next packet from said ordering queue to a selected transmit queue further includes the steps of:
   enqueuing a software-handled packet from said ordering queue to said selected transmit queue; and
   automatically moving each said autoroute packet reaching a head of said ordering queue to said selected transmit queue.

3. A method for implementing packet ordering as recited in claim 1 wherein the step of providing a queue entry for said received packets; said queue entry including for each autoroute packet, said autoroute indication and said selected transmit queue includes the step of identifying said selected transmit queue by dataflow assist hardware without software intervention.

4. A method for implementing packet ordering as recited in claim 1 wherein the step of dequeuing a software-handled packet includes the step of identifying a pointer to said software-handled packet in a packet segment register.

5. Apparatus for implementing packet ordering in a network processor comprising:

a receive queue for receiving packets; said receive queue including a queue entry for each said received packet; said queue entry including for each autoroute packet, an autoroute indication and a selected transmit queue;

an associated ordering queue with said receive queue;

software for dequeuing a software-handled packet from said receive queue and placing said dequeued software-handled packet on said ordering queue; and dataflow assist hardware for automatically moving each said autoroute packet reaching a head of said receive queue to said ordering queue; and for moving a next packet from said ordering gueue to a selected transmit gueue for network transmission.

6. Apparatus for implementing packet ordering as recited in claim 5 includes software for enqueuing a software-handled packet from said ordering queue to said selected transmit queue; and wherein said dataflow assist hardware automatically moves each said autoroute packet reaching a head of said ordering queue to said selected transmit queue.

7. Apparatus for implementing packet ordering as recited in claim 5 wherein said dataflow assist hardware identifies said selected transmit queue for each said autoroute packet without software intervention.

8. Apparatus for implementing packet ordering as recited in claim 5 wherein said software for dequeuing said software-handled packet includes a pointer to said software-handled packet in a packet segment register.

9. A computer readable storage media for implementing packet ordering in a network processor system, said computer readable storage media including a plurality of computer executable instructions and, wherein said instructions, when executed by the network processor system, cause the network processor system to perform the steps of:

providing a receive queue for receiving packets; said receive queue including a queue entry for each said received packet; said queue entry including for each autoroute packet, an autoroute indication and a selected transmit queue;

providing an associated ordering queue with said receive queue;

dequeuing a software-handled packet from said receive queue and placing said dequeued software-handled packet on said ordering queue;

automatically moving each said autoroute packet reaching a head of said receive queue to said ordering queue; and moving a next packet from said ordering gueue to a selected transmit gueue for network transmission.

10. A computer readable storage media for implementing packet ordering as recited in claim 9 wherein moving a next packet from said ordering queue to a selected transmit queue includes the steps of: enqueuing a software-handled packet from said ordering queue to said selected transmit queue; and automatically moving each said autoroute packet reaching a head of said ordering queue to said selected transmit queue.

11. A computer readable storage media for implementing packet ordering as recited in claim 9 wherein the step of dequeuing a software-handled packet includes the step of identifying a pointer to said software-handled packet in a packet segment register.

12. A computer readable storage media for implementing packet ordering as recited in claim 9 includes the step of identifying said selected transmit queue by dataflow assist hardware without software intervention.

* * * * *